(12) United States Patent
Anders et al.

(10) Patent No.: US 9,067,501 B2
(45) Date of Patent: Jun. 30, 2015

(54) SYSTEM AND METHOD FOR ADJUSTING BALANCE OF OPERATION OF HYDRAULIC AND ELECTRIC ACTUATORS

(75) Inventors: Jonathan W. Anders, Peoria, IL (US); Corey L. Gorman, Kobe (JP); John J. Bernardi, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 887 days.

(21) Appl. No.: 13/078,295

(22) Filed: Apr. 1, 2011

(65) Prior Publication Data
US 2012/0253570 A1 Oct. 4, 2012

(51) Int. Cl.
*B60L 11/16* (2006.01)
*B60L 15/20* (2006.01)

(52) U.S. Cl.
CPC ............ *B60L 11/16* (2013.01); *B60L 15/2045* (2013.01); *B60L 2200/40* (2013.01); *Y02T 10/7283* (2013.01)

(58) Field of Classification Search
CPC . B60L 11/16; B60L 15/2045; B60L 2200/40; Y02T 10/7027; Y02T 10/6208; B60K 37/06; B60K 6/12; B60R 16/03; B60R 16/0231; E02F 9/2025; E02F 9/2217; A01B 79/005; F16H 61/702; F15B 21/14; F15B 2211/88
See application file for complete search history.

(56) References Cited

U.S. PATENT DOCUMENTS

| 5,898,282 | A | 4/1999 | Drozdz et al. | |
| 6,293,033 | B1 * | 9/2001 | Moriya et al. | 37/348 |
| 6,745,117 | B1 | 6/2004 | Thacher et al. | |
| 6,820,356 | B2 | 11/2004 | Naruse et al. | |
| 7,069,673 | B2 | 7/2006 | Kagoshima et al. | |
| 7,472,008 | B2 * | 12/2008 | Betz et al. | 701/50 |
| 7,669,413 | B2 * | 3/2010 | Komiyama et al. | 60/414 |
| 7,751,954 | B2 | 7/2010 | Matsuda et al. | |
| 8,095,285 | B2 * | 1/2012 | Schifferer et al. | 701/54 |
| 8,190,318 | B2 * | 5/2012 | Li et al. | 701/22 |
| 2008/0082240 | A1 | 4/2008 | Kagoshima et al. | |
| 2008/0142232 | A1 * | 6/2008 | Palmer et al. | 172/2 |
| 2008/0300743 | A1 | 12/2008 | Conlon et al. | |
| 2009/0223214 | A1 * | 9/2009 | Drake et al. | 60/327 |
| 2010/0280697 | A1 * | 11/2010 | Yanagisawa et al. | 701/22 |

FOREIGN PATENT DOCUMENTS

| JP | 2005163605 A | 6/2005 |
| JP | 2009127296 A | 6/2009 |
| WO | WO 2008/128416 A1 | 10/2008 |

* cited by examiner

*Primary Examiner* — Khoi Tran
*Assistant Examiner* — Bao Long T Nguyen
(74) *Attorney, Agent, or Firm* — Finnegan, Henderson, Farabow, Garrett & Dunner, LLP

(57) ABSTRACT

A system for controlling power in a machine includes an interface and a controller configured to receive a signal indicative of a requested hydraulic operation of a hydraulic actuator corresponding to a requested hydraulic power level. The controller is further configured to receive a signal indicative of a requested electric operation of the electric actuator corresponding to a requested electric power level. The controller is also configured to provide a signal for supplying electric power to the electric actuator less than the requested electric power level based on an electric power output ratio, and provide a signal for supplying hydraulic power to the hydraulic actuator less than the requested hydraulic power level based on a hydraulic power output ratio. At least one of the electric power output ratio and the hydraulic power output ratio is adjustable via the interface.

22 Claims, 4 Drawing Sheets

SYSTEM AND METHOD FOR ADJUSTING BALANCE OF OPERATION OF HYDRAULIC AND ELECTRIC ACTUATORS

TECHNICAL FIELD

The present disclosure relates to a system and method for controlling operation of hydraulic and electric actuators in a machine having hydraulic and electric power sources and, more particularly, a system and method for adjusting balance of operation of hydraulic and electric actuators.

BACKGROUND

Some conventional machines have a hydraulic power source for operating hydraulic actuators. For example, such a machine might typically include an internal combustion engine for driving one or more hydraulic pumps, which, in turn, supply power to one or more hydraulic actuators for performing work. One example of such a machine is a hydraulic excavator. A hydraulic excavator may typically include one or more hydraulic pumps, which provide hydraulic power in the form of pressurized fluid flow to one or more hydraulic motors and actuators such as a boom and a digging implement. In such a machine, the hydraulic motors may be used to rotate a cab relative to a chassis on which the cab is mounted and drive grounding engaging wheels or tracks for movement of the machine. Hydraulic power provided to the hydraulic actuators may be used to raise and lower the boom and manipulate the digging implement in order to perform digging and/or loading operations.

To increase the efficiency and/or reduce undesirable emissions resulting from operation of the internal combustion engine, efforts have been made to recapture some of the energy typically lost during operation of such a machine. For example, some energy is able to be recaptured in the form of stored hydraulic energy, and some energy is able to be recaptured in the form of stored electric energy via electric motor/generators. Thus, it may be desirable to perform some working functions in a machine with both stored hydraulic energy and stored electric energy by use of both hydraulic and electric actuators. However, in such a machine, the hydraulic actuators and electric actuators may have differing operational characteristics, which may result in undesirable operation (e.g., unbalanced responsiveness and/or speed).

Therefore, it may be desirable to provide a system and method for operating hydraulic and electric actuators in a manner that results in balanced operation, for example, when the requested operation of hydraulic actuators exceeds the maximum available hydraulic power of the machine. For example, such a system and method may control operation of hydraulic and electric actuators so that the hydraulic actuators and electric actuators operate simultaneously with anticipated responsiveness and/or speed, even when the requested operation of hydraulic actuators exceeds the maximum available hydraulic power of the machine. In addition, it may be desirable to provide a machine operator and/or service technician with a system and method for adjusting the balance of operation of hydraulic and electric actuators so that the balance between operation of hydraulic and electric actuators may be tailored to operate according to preferences of a machine operator.

A system and method for operating a machine having an electric motor and hydraulic actuators in disclosed in U.S. Patent Application Publication No. US 2008/0082240 A1 to Kagoshima et al. ("the '240 application"). In particular, the '240 application discloses a rotation control device for controlling the speed of rotation of an electric motor based on a hydraulic boom raising operation when simultaneously performing a rotation action and a boom raising action. According to the '240 application, acceleration of the electric motor is reduced based on the boom raising operation.

Although the system and method disclosed in the '240 application reduce the amount of acceleration of the electric motor based on the boom raising operation, the machine disclosed in the '240 application may still suffer undesirable operational traits. For example, the system and method disclosed in the '240 application does not account for situations in which operation of the actuators of the machine is limited to a predetermined maximum available power level (e.g., by machine design) or by capacity limitations of the power systems. In particular, operation of the hydraulic power sources and/or the electric power sources may be limited either by design, for example, in order to reduce strain on the various parts of the machine, or by virtue of a limit of capacity of the power of the machine, for example, when combined requests for operation of the hydraulic and/or electric actuators exceeds the capacity of the power sources of the machine. Therefore, it may be desirable to provide a system and method for controlling power in a machine having hydraulic and electric power sources that results in balanced operation of hydraulic and electric actuators, and further, to provide a machine operator and/or service technician with a system and method for adjusting the balance of operation of hydraulic and electric actuators so that the balance between operation of hydraulic and electric actuators may be tailored according to preferences of a machine operator.

SUMMARY

In one aspect, the present disclosure includes a system for controlling power in a machine including an electric power source, a hydraulic power source, an electric actuator, and a hydraulic actuator. The system includes an interface and a controller configured to receive a signal indicative of a requested hydraulic operation of the hydraulic actuator, the requested hydraulic operation corresponding to a requested hydraulic power level. The controller is also configured to receive a signal indicative of a requested electric operation of the electric actuator, the requested electric operation corresponding to a requested electric power level. The controller is further configured to provide a signal for supplying an amount of electric power to the electric actuator at a level less than the requested electric power level based on an electric power output ratio. The controller is also configured to provide a signal for supplying an amount of hydraulic power to the hydraulic actuator at a level less than the requested hydraulic power level based on a hydraulic power output ratio. At least one of the electric power output ratio and the hydraulic power output ratio is adjustable via the interface.

According to another aspect, the disclosure includes a method of operating a hydraulic actuator and an electric actuator. The method includes receiving a signal indicative of a requested hydraulic operation of the hydraulic actuator, the requested hydraulic operation corresponding to a requested hydraulic power level. The method also includes receiving a signal indicative of a requested electric operation of the electric actuator, the requested electric operation corresponding to a requested electric power level. The method further includes providing a signal for supplying an amount of electric power to the electric actuator at a level less than the requested electric power level based on an electric power output ratio, and providing a signal for supplying an amount of hydraulic power to the hydraulic actuator at a level less than the requested hydraulic power level based on a hydraulic power output ratio. The method further includes adjusting at least one of the electric power output ratio and the hydraulic power output ratio via an interface.

According to a further aspect, the disclosure includes a machine including a chassis, an interface, an electric power source coupled to the chassis, and a hydraulic power source coupled to the chassis. The machine further includes an electric actuator coupled to the machine and in operative communication with the electric power source, and a hydraulic actuator coupled to the machine and in operative communication with the hydraulic power source. The machine further includes a controller configured to receive a signal indicative of a requested hydraulic operation of the hydraulic actuator, the requested hydraulic operation corresponding to a requested hydraulic power level. The controller is further configured to receive a signal indicative of a requested electric operation of the electric actuator, the requested electric operation corresponding to a requested electric power level. The controller is also configured to provide a signal for supplying an amount of electric power to the electric actuator at a level less than the requested electric power level based on an electric power output ratio, and provide a signal for supplying an amount of hydraulic power to the hydraulic actuator at a level less than the requested hydraulic power level based on a hydraulic power output ratio. At least one of the electric power output ratio and the hydraulic power output ratio is adjustable via the interface.

DETAILED DESCRIPTION

Figure 1:
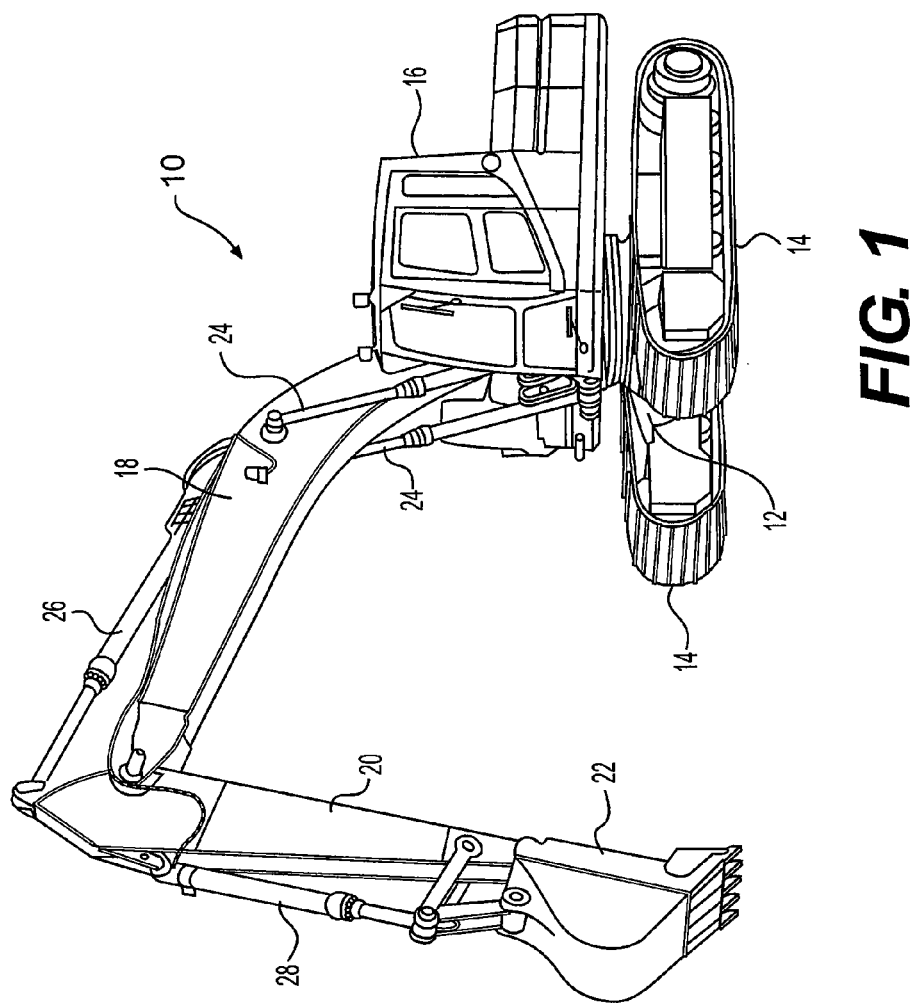
FIG. 1 is a schematic perspective view of an exemplary embodiment of a machine including an exemplary embodiment of system for controlling power in the machine.

FIG. 1 shows an exemplary embodiment of a machine 10 for performing work. In particular, the exemplary machine 10 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

As shown in FIG. 1, exemplary machine 10 includes a chassis 12 flanked by ground-engaging members 14 for moving machine 10 (e.g., ground-engaging tracks or wheels). Machine 10 includes an operator cab 16 mounted to chassis 12 in a manner that permits rotation of cab 16 with respect to chassis 12. A boom 18 is coupled to cab 16 in a manner that permits boom 18 to pivot with respect to cab 16. At an end opposite cab 16, a stick 20 is coupled to boom 18 in a manner that permits stick 20 to pivot with respect to boom 18. At an end opposite boom 18, a digging implement 22 (e.g., a bucket) is coupled to stick 20 in a manner that permits digging implement 22 to pivot with respect to stick 20. Although exemplary machine 10 shown in FIG. 1 includes digging implement 22, other tools may coupled to stick 20 when other types of work are desired to be performed.

In the exemplary embodiment shown, a pair of actuators 24 are coupled to cab 16 and boom 18, such that extension and contraction of actuators 24 raises and lowers boom 18, respectively, relative to cab 16. An actuator 26 is coupled to boom 18 and stick 20, such that extension and retraction of actuator 26 results in stick 20 pivoting inward and outward, respectively, with respect to boom 18. Actuator 28 is coupled to stick 20 and digging implement 22, such that extension and retraction of actuator 28 results in digging implement 22 pivoting between closed and open positions, respectively, with respect to stick 20.

Figure 2:
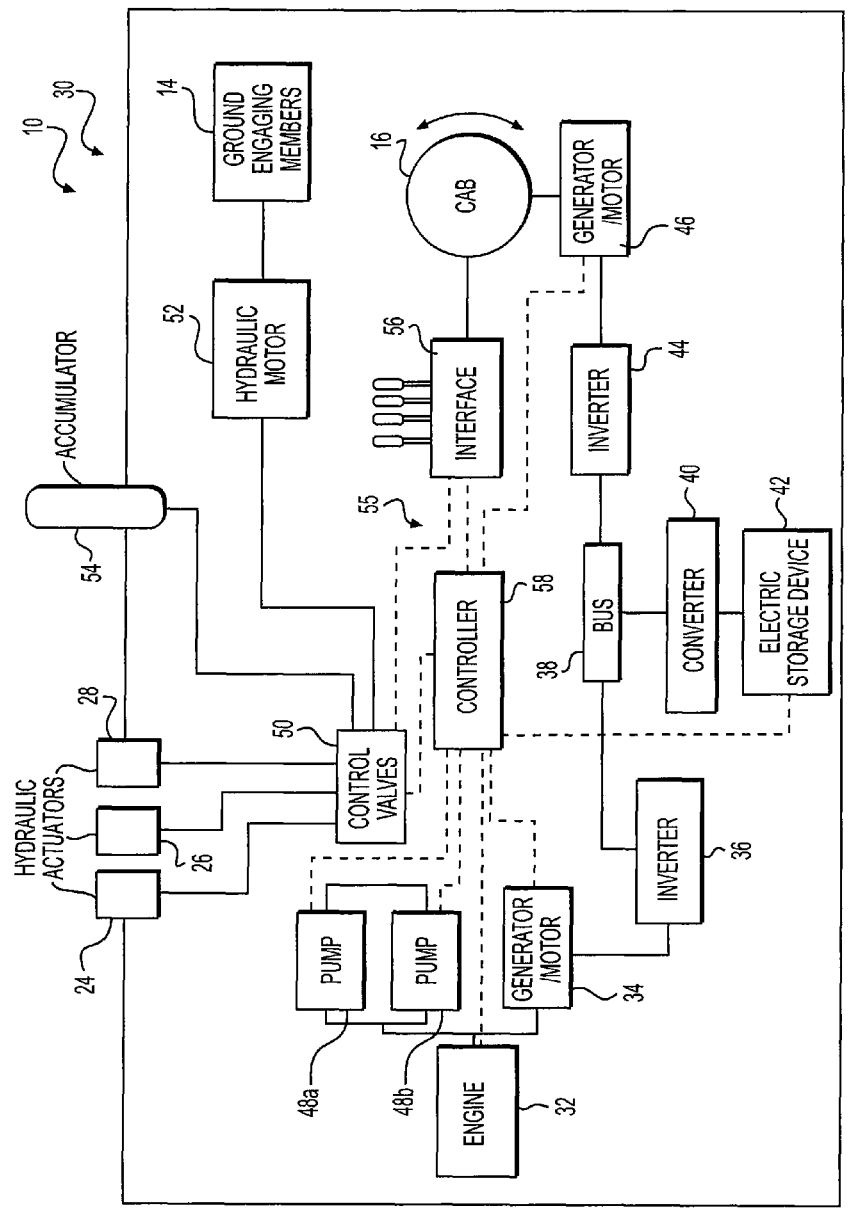
FIG. 2 is a schematic diagram of an exemplary embodiment of a machine including an exemplary embodiment of power system in the machine.

As explained in more detail with respect to FIG. 2, exemplary actuators 24, 26, and 28 are hydraulic actuators, in particular, hydraulic cylinders powered by supplying and draining fluid from the cylinders on either side of a piston to cause reciprocating movement of the piston within the cylinder. One or more of actuators 24, 26, and 28 may be non-hydraulic actuators without departing from the concepts disclosed herein. In addition, the number of each of actuators 24, 26, and 28 coupled to boom 18, stick 20, and/or digging implement 22, respectively, may be changed without departing from the concepts disclosed herein.

Referring to FIG. 2, exemplary machine 10 includes a power system 30 including hydraulic and electric actuators operated respectively via hydraulic and electric power sources and controlled by a controller. In particular, exemplary power system 30 includes an engine 32. Engine 32 may be, for example, a compression-ignition engine, a spark-ignition engine, a gas turbine engine, a homogeneous-charge compression ignition engine, a two-stroke engine, a four-stroke, or any type of internal combustion engine known to those skilled in the art. Engine 32 may be configured to operate on any fuel or combination of fuels, such as, for example, diesel, bio-diesel, gasoline, ethanol, methanol, or any fuel known to those skilled in the art. Further, engine 32 may be supplemented by a hydrogen-powered engine, fuel-cell, solar cell, and/or any power source known to those skilled in the art.

In the exemplary embodiment shown, power system 30 includes a generator 34 (e.g., an AC motor/generator) coupled to engine 32, such that engine 32 drives generator 34, thereby generating electric power. Generator 34 is electrically coupled to an inverter 36 (e.g., an AC-DC inverter), which, in turn, is electrically coupled to a bus 38 (e.g., a DC bus). The exemplary power system 30 further includes a converter 40 electrically coupled to bus 38. Converter 40 may be a DC-DC bi-directional converter, which, in turn, is electrically coupled to an electric storage device 42. Electric storage device 42 may include one or more batteries and/or ultra-capacitors configured to store electric energy supplied from generator 34 and/or or any electrical energy generated by capturing energy associated with operation of machine 10, such as energy captured from regenerative braking of moving parts of 10 machine, such as, for example, ground-engaging members 14 and/or rotation of cab 16. Electric energy stored in electric storage device 42 may be used as a source of electric power as explained in more detail below.

Exemplary power system 30 further includes an inverter 44 (e.g., an AC-DC inverter) coupled to bus 38. Inverter 44 is electrically coupled to an electric motor 46 (e.g., an AC motor/generator). In the exemplary embodiment shown, electric motor 46 is coupled to cab 16 such that operation of electric motor 46 results in cab 16 rotating relative to chassis 12. In addition, electric motor 46 may be a combination motor/generator capable of slowing and stopping rotation of cab 16 in a regenerative manner that results in electric energy being generated that may be routed via inverter 44, bus 38, and converter 40 to electric storage device 42 for later supply to electric actuators such as electric motor 46. According to some embodiments, electric energy in electric storage device 42 may be routed via converter 40, bus 38, and inverter 36 to generator/motor 34, which may then use the electric energy to supplement engine 32 and/or drive one or more of pumps 48*a* and 48*b*, thus enabling electric power sources to assist engine 32 and/or hydraulic power sources in machine 10. According to some embodiments, electric energy generated by generator/motor 46 may be routed to generator/motor 34 without necessarily being stored in electric storage device 42, for example, by being routed from generator/motor 46, via inverter 44, bus 38, and inverter 36 to generator/motor 34.

In the exemplary embodiment shown in FIG. 2, engine 32 is coupled to two hydraulic pumps 48*a* and 48*b*, which may be fixed-displacement or variable-displacement pumps. Although the exemplary embodiment shown includes two hydraulic pumps 48*a* and 48*b*, a single pump or more than two hydraulic pumps may be used. In the exemplary configuration shown, engine 32 supplies mechanical power to drive pumps 48*a* and 48*b*, which, in turn, provide hydraulic power to power system 30 by causing pressurized fluid to flow to and from hydraulic actuators.

In the exemplary embodiment shown in FIG. 2, pumps 48*a* and 48*b* are hydraulically coupled to control valves 50 such that pumps 48*a* and 48*b* supply pressurized fluid to control valves 50, which, in turn, control fluid flow to and from hydraulic actuators and other hydraulic devices of machine 10. For example, as shown in FIG. 2, control valves 50 are hydraulically coupled to hydraulic actuators 24, 26, 28, and hydraulic motor 52, which, when supplied with pressurized fluid flow, drive ground-engaging members 14. Although a single hydraulic motor 52 is shown, power system 30 may include two or more hydraulic motors 52, for example, one for each of ground-engaging members 14. Further, hydraulic motor(s) 52 may be combination pump/motor(s) capable of slowing and stopping ground-engaging members 14 in a regenerative manner that results in hydraulic energy being generated that may be rerouted to provide hydraulic power to power system 30 and/or stored in a hydraulic storage device for later supply of hydraulic power to hydraulic actuators, as explained in more detail below.

Exemplary power system 30 also includes an accumulator 54 hydraulically coupled to control valves 50. Accumulator 54 is configured to store hydraulic energy captured during operation of power system 30. For example, as explained above, hydraulic motor(s) 52 may be configured to slow movement of ground-engaging members 14 by operating as pumps such that ground-engaging members 14 drive the pumps, thereby slowing ground-engaging members 14. The energy supplied to the hydraulic fluid by virtue of the pumping may be routed via control valves 50 for storage in accumulator 54 for later use.

Exemplary power system 30 also includes hydraulic actuators 24, 26, and 28, each hydraulically coupled to control valves 50. As explained with respect to FIG. 1, hydraulic actuators 24, 26, and 28 are respectively coupled to boom 18, stick 20, and digging implement 22 for manipulating boom 18, stick, 20, and digging implement 22. Similar to hydraulic motor(s) 52, hydraulic actuators 24, 26, and 28 may be operated in a regenerative manner that results in hydraulic energy being generated that may be rerouted to provide hydraulic power to power system 30 and/or stored in accumulator 54. For example, if boom 18 is lowered from an elevated position, pressurized fluid is forced in a controlled manner from actuators 24. This pressurized fluid may routed via control valves 50 for storage in accumulator 54.

The exemplary power system 30 shown in FIG. 2 includes a system 55 for controlling power system 30. For example, power system 30 includes an interface 56 (e.g., a machine operator interface and/or service technician interface) that may be contained in cab 16. According to some embodiments, interface 56 may be located remote from machine 10 for remote control of machine 10. Exemplary interface 56 includes a number of controls (e.g., levers, pedals, and/or buttons) for control of machine 10 and its functions. In the exemplary embodiment shown, interface 56 is coupled to control valves 50, electrically and/or hydraulically, so that electric control signals and/or hydraulic control signals (e.g., via a hydraulic pilot circuit) may be sent from interface 56 to control valves 50. Such electric and hydraulic control signals may be used to control operation of controls valves 50 for operation and control of the hydraulic actuators of power system 30. In addition, interface 56 is coupled electrically to a controller 58 configured to control operation of one or more components of exemplary power system 30, as explained in more detail below.

Controller 58 may include one or more processors, microprocessors, central processing units, on-board computers, electronic control modules, and/or any other computing and control devices known to those skilled in the art. Controller 58 may be configured run one or more software programs or applications stored in a memory location, read from a computer-readable medium, and/or accessed from an external device operatively coupled to controller 58 by any suitable communications network.

Controller 58 may be configured to control operation of hydraulic and electric actuators associated with machine 10 in a manner that results in desirable operation (e.g., balanced responsiveness and/or speed) of both the hydraulic and electric actuators. For example, controller 58 may be configured to control distribution of both hydraulic and electric power to the actuators, for example, when the requested power for combined operation of the hydraulic and electric actuators exceeds the maximum available combined hydraulic and electric power level of machine 10. For example, a combined maximum available power level may be the lesser of (1) the combined maximum available power available from all power sources of machine 10 (e.g., from hydraulic power sources and electric power sources), and (2) a predetermined combined maximum available power level based on a predetermined power level that prevents excessive wear on the various parts of machine 10 (e.g., a designed machine operating power level). In either situation, operation of some of the actuators (e.g., hydraulic and/or electric actuators) may be less responsive and/or slower than the requested operation. However, some of the actuators, by virtue of being supplied with power from a different power system (e.g., electric power sources rather than hydraulic power sources) that might not be operating at maximum available power, may continue to operate with a customary response and speed. This potential disparity between the operation of various actuators based on receiving power from a different power source may result in undesirable (e.g., unbalanced) control characteristics of machine 10.

For example, if the hydraulic power sources are overburdened and hydraulic actuators 24 are requested by the operator to raise boom 18, and the electric motor 46 is requested by the operator to simultaneously rotate cab 16, the hydraulic actuators 24 may raise boom 18 more slowly than the operator expects, while electric motor 46 rotates cab 16 with the speed expected by the operator. This may result in undesirable movement of boom 18, stick 20, and digging implement 22, due to boom 18 being less responsive and/or raising slower than requested while cab 16 rotates as expected.

According to some embodiments, controller 58 may be configured to control distribution of both hydraulic and electric power to the actuators, for example, when the requested hydraulic power for operation of the hydraulic actuators exceeds the maximum available hydraulic power level of machine 10. For example, controller 58 may be configured to limit the hydraulic power supplied to the hydraulic actuators to a maximum hydraulic power level based on a predetermined power level (e.g., a designed power level) that prevents excessive wear on the various parts of machine 10. In addition, the maximum hydraulic power level available to be supplied to the hydraulic actuators may be limited by the maximum capacity of the hydraulic power sources. In either situation, operation of the hydraulic actuators will be less responsive and/or slower than the requested operation. However, the electric actuators, by virtue of being supplied with power from electric power sources rather than the hydraulic power sources, may continue to operate with a customary response and speed. This potential disparity between the operation of the hydraulic actuators and the electric actuators may result in undesirable (e.g., unbalanced) control characteristics of machine 10. For example, if hydraulic actuators 24 are requested by the operator to raise boom 18 and the electric motor 46 is requested by the operator to simultaneously rotate cab 16, the hydraulic actuators 24 may raise boom 18 more slowly than the operator expects, while electric motor 46 rotates cab 16 with the speed expected by the operator. This may result in undesirable movement of boom 18, stick 20, and digging implement 22, due to boom 18 being less responsive and/or raising slower than requested while cab 16 rotates as expected.

According to some embodiments, controller 58 may be configured to control distribution of both hydraulic and electric power to the actuators, for example, when the requested electric power for operation of the electric actuators exceeds the maximum available electric power level of machine 10. For example, controller 58 may be configured to limit the electric power supplied to the electric actuators to a maximum electric power level based on a predetermined power level (e.g., a designed power level) that prevents excessive wear on the various parts of machine 10. In addition, the maximum electric power level available to be supplied to the electric actuators may be limited by the maximum capacity of the electric power sources. In either situation, operation of the electric actuators will be less responsive and/or slower than the requested operation. However, the hydraulic actuators, by virtue of being supplied with power from hydraulic power sources rather than the electric power sources, may continue to operate with a customary response and speed. This potential disparity between the operation of the hydraulic actuators and the electric actuators may result in undesirable (e.g., unbalanced) control characteristics of machine 10.

Figure 3:
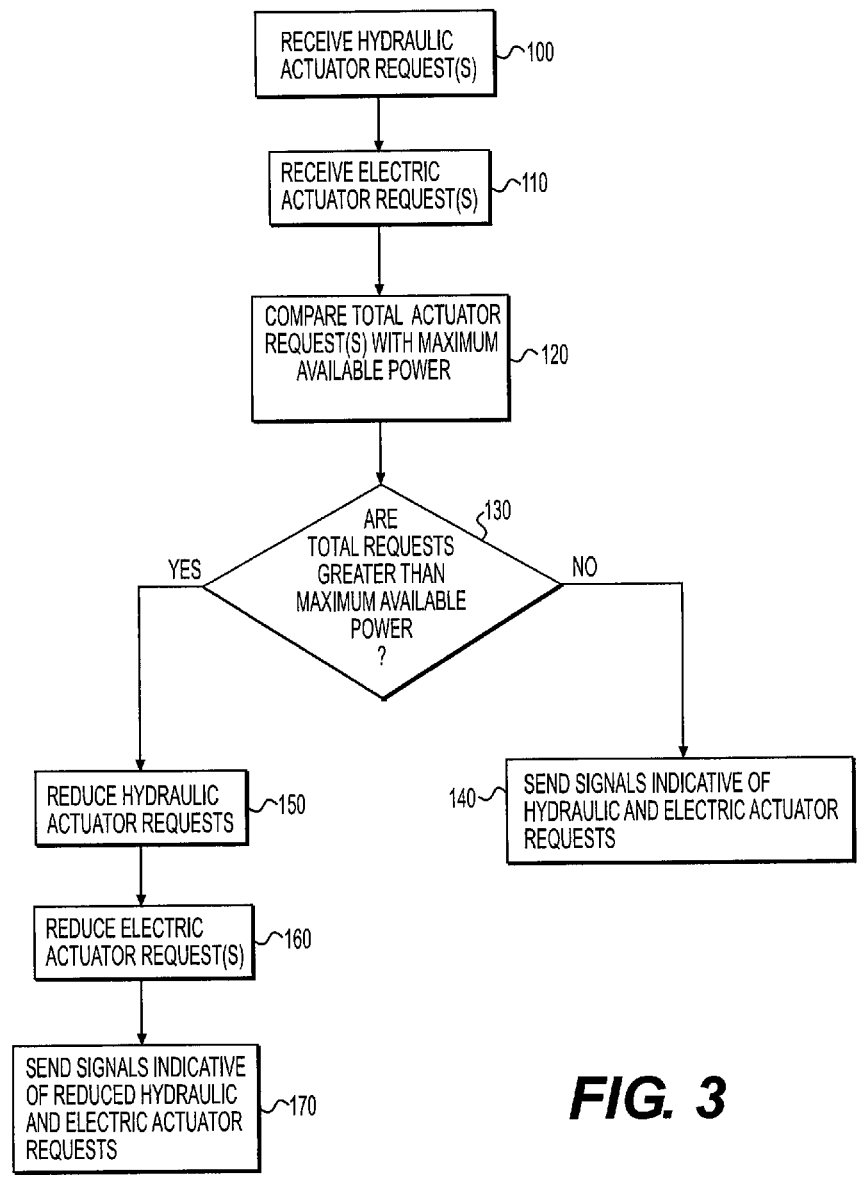
FIG. 3 is a flow diagram of an exemplary embodiment of a method for controlling power in an exemplary machine.

According to some embodiments, exemplary controller 58 may be configured to balance operation of the hydraulic actuators and electric actuators when, for example, the combined requested hydraulic and electric power for operation of the hydraulic and electric actuators exceeds the maximum available hydraulic power of machine 10. For example, during exemplary operation as shown in FIG. 3, at step 100 exemplary controller 58 receives signals indicative of a requested hydraulic operation of one or more of hydraulic actuators 24, 26, and 28 from operator interface 56, such signals corresponding to a requested hydraulic power level.

At step 110, controller 58 receives signals indicative of a requested electric operation of the electric actuator 46 from operator interface 56, such signals corresponding to a requested electric power level. Thereafter, controller 58 at step 120 compares at least one of the following: a combined requested power level that is a sum of the requested hydraulic and electric power levels to a combined maximum available power level, the requested hydraulic power level to a maximum available hydraulic power level, and the requested electric power level to a maximum available electric power level.

At step 130, according to some embodiments, if the combined requested power level is less than the combined maximum available power levels of the hydraulic and electric power sources, at step 140 the controller 58 sends signals to hydraulic actuators 24, 26, and 28 (via control valves 50) and electric actuator 46 according to the respective requested operations of the hydraulic and electric actuators. According to some embodiments, at step 130, if the requested hydraulic power level is less than the maximum available hydraulic power level of the hydraulic power sources, at step 140 the controller 58 sends signals to hydraulic actuators 24, 26, and 28 (via control valves 50) and electric actuator 46 according to the respective requested operations of the hydraulic and electric actuators. According to some embodiments, at step 130, if the requested electric power level is less than the maximum available electric power level of the electric power sources, at step 140 the controller 58 sends signals to hydraulic actuators 24, 26, and 28 (via control valves 50) and electric actuator 46 according to the respective requested operations of the hydraulic and electric actuators.

However, according to some embodiments, if at step 130 the combined requested power level is greater than the maximum available power level from the hydraulic and electric power sources, at step 150 controller 58 reduces the requested hydraulic power level to an amount less than requested, and at step 160, the controller 58 reduces the requested electric power level to an amount less than requested. According to some embodiments, if at step 130 the requested hydraulic power level is greater than the maximum available hydraulic power level from the hydraulic power sources, at step 150 controller 58 reduces the requested hydraulic power level to an amount less than requested, and at step 160, the controller 58 reduces the requested electric power level to an amount less than requested. According to some embodiments, if at step 130 the requested electric power level is greater than the maximum available electric power level from the electric power sources, at step 150 controller 58 reduces the requested hydraulic power level to an amount less than requested, and at step 160, the controller 58 reduces the requested electric power level to an amount less than requested. At step 170 controller 58 sends signals for supplying an amount of hydraulic power to hydraulic actuators 24, 26, and 28 at a level less than the requested hydraulic power level, and sends signals for supplying an amount of electric power to electric actuator 46 at a level less than the requested electric power level. In this exemplary manner, the controller 58 may reduce the responsiveness and/or speed of both the hydraulic and electric actuators, so that they operate in a desirable (e.g., a balanced) manner.

According to some embodiments, control system 55 may determine when hydraulic and electric power needs to be limited based on comparing the combined requested power level (e.g., the total system power requested) to a combined maximum available power level (e.g., the total system power available) as well as to a predetermined combined maximum available power level (e.g., a designed machine operating power). For example, when control system 55 limits electric and/or hydraulic power, the hydraulic power supplied to the hydraulic actuators may be calculated based on the requested hydraulic power and a ratio for the hydraulic power with respect to the other power requests. Likewise, when control system 55 limits electric or hydraulic power, the electric power supplied to the electric actuators may be calculated based on the requested electric power and a ratio for the electric power with respect to the other power requests. The ratios used in this power limiting may be determined based on the nature of the different machine actuators or based on the instantaneous operating characteristics of the actuators.

For example, if a power value of 100 is available for allocation and two actuators are each requesting 100, the power for the two actuators may be limited. If each of the actuators has a ratio value of 1, when the two actuators are limited they may each receive a power allocation of 50. If in the same case where a value of 100 is available, and two actuators are each requesting 100 but one has a ratio of 0.5 and the other has a ratio of 1, the actuator with the ratio of 1 may receive a power allocation of 66.7, and the actuator with the ratio of 0.5 may receive an allocation of 33.3.

As another example, if a power value of 100 is available for allocation, and two actuators are requesting 100 and 50, respectively, the power for the two actuators may be limited. If each actuator has a ratio of 1, then when the two actuators are limited the one requesting 100 may receive a power allocation of 66.7 and the one requesting 50 may receive a power allocation of 33.3. If in the same case where a value of 100 is available, the actuator requesting 100 has a ratio of 1 but the actuator requesting 50 has a ratio of 2, the actuator requesting 100 may receive a power allocation of 50, and the actuator requesting 50 may receive a power allocation of 50.

Figure 4:
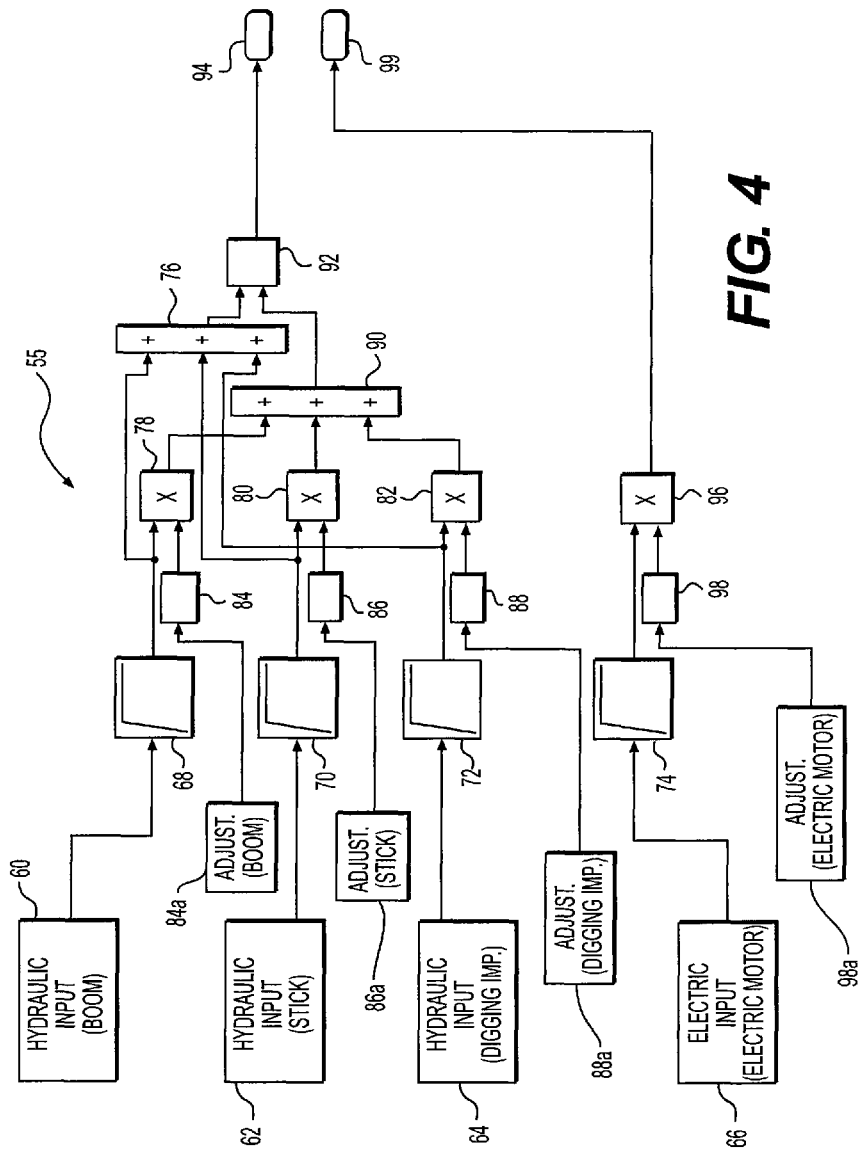
FIG. 4 is a schematic diagram of an exemplary embodiment of a system for controlling power in an exemplary machine.

FIG. 4 is a schematic diagram of part of an exemplary control system 55 for determining the ratios for use in power allocation in exemplary machine 10. As shown in FIG. 4, controller 58 may be configured to determine ratios for use in hydraulic and electric power balancing based on the hydraulic and electric requested operation. For example, signals from operator interface 56 are received as hydraulic inputs 60 for boom 18, 62 for stick 20, and 64 for digging implement 22 or other tool or implement. For example, input 60 may range from a signal corresponding to raising boom 18 at a maximum rate to a signal corresponding to lowering boom 18 at a maximum rate; input 62 may range from a signal corresponding to pulling back stick 20 at a maximum rate to a signal corresponding to pushing out stick 20 at a maximum rate; and input 64 may range from a signal corresponding to closing digging implement 22 at a maximum rate to a signal corresponding to opening up digging implement 22 at a maximum rate. Similarly, input signals from operator interface 56 are received as electric inputs 66 for operating electric motor 46 to rotate cab 16 to the right at a maximum rate and to the left at a maximum rate.

Signals from the hydraulic and electric inputs 60, 62, 64, and 66 are received by respective lookup tables 68, 70, 72, and 74, which correlate the input signals to weighting values used in determining the ratios for each of hydraulic actuators 24, 26, and 28, and electric motor 46. One or more of these lookup tables 68, 70, 72, 74 for determining the weighting values may be replaced or supplemented by maps and/or mathematical relations. Predetermined ratios 84, 86, 88, and 98 for each of the hydraulic actuators 24, 26, and 28 and the electric motor 46 may be used in determining the power ratios for use in balancing the power allocated to the hydraulic and electric actuators. For example, predetermined hydraulic power output ratios 84, 86, and 88 may have values of, for example, 0.7, 0.3, and 0.3 respectively, these values being exemplary only. Predetermined power ratios 84, 86, and/or 88 may be determined through computer simulation and/or experimentation to achieve desired responsiveness and/or speed of operation of hydraulic actuators 24, 26, and 28. Predetermined electric power output ratio 98 may have a value of, for example, 0.5, this value being exemplary only. Predetermined power ratio 98 may be determined through computer simulation and/or experimentation to achieve desired responsiveness and/or speed of operation of electric actuator 46. For example, these predetermined ratios 84, 86, 88, and 98 may be multiplied by the weighting values at 78, 80, 82, and 96, respectively.

If, for example, the three hydraulic actuators 24, 26, and 28 are grouped and balanced together with respect to the electric actuator 46, a normalized ratio for the combined hydraulic actuators may be calculated at 92 based on the ratio of the combined weighted ratio at 90 and the combined weighting values at 76. This normalized ratio 94 for the combined hydraulic actuators may be used to control the total combined hydraulic power output level supplied by the hydraulic power sources (e.g., from one or more of hydraulic pumps 48*a* and 48*b*, hydraulic regeneration from hydraulic motor 52, accumulator 54, and hydraulic regeneration from hydraulic actuators 24, 26, and 28) when balancing with other devices, including electric actuators.

According to some embodiments, if the total requested hydraulic power output at 76 exceeds the maximum available hydraulic power output level, the requested power output level of each of the hydraulic actuators 24, 26, and 28 is reduced according to respective predetermined hydraulic power output ratios. For example, each of the power output signals from lookup tables 68, 70, and 72 associated with the input signals for the hydraulic actuators 24, 26, and 28 is multiplied at 78, 80, and 82 by respective predetermined hydraulic power output ratios 84, 86, and 88 to determine reduced hydraulic power output levels for each of actuators 24, 26, and 28. For example, predetermined hydraulic power output ratios 84, 86, and 88 may have values of, for example, 0.7, 0.3, and 0.3 respectively, these values being exemplary only. Predetermined hydraulic power output ratios 84, 86, and/or 88 may be determined through computer simulation and/or experimentation to achieve desired responsiveness and/or speed of operation of hydraulic actuators 24, 26, and 28.

According to some embodiments, tables 68, 70, and 72 may be used to determine requested power based on respective inputs 60, 62, and 64. For such embodiments, the reduced hydraulic power output levels may be added together at 90 to determine a total reduced hydraulic power output level. Thereafter, at 92 the total reduced hydraulic power output level is divided by the total requested hydraulic power output level to determine a combined hydraulic power output ratio at 94, which may be used to control the total hydraulic power output level supplied by the hydraulic power sources (e.g., from one or more of hydraulic pumps 48*a* and 48*b*, hydraulic regeneration from hydraulic motor 52, accumulator 54, and hydraulic regeneration from hydraulic actuators 24, 26, and 28).

The exemplary predetermined hydraulic power output ratios 84, 86, and 88 for actuators 24, 26, and 28, respectively, may provide balanced operation among hydraulic actuators 24, 26, and 28. Thus, for the exemplary ratios 84, 86, and 88 (i.e., 0.7, 0.3, and 0.3), if boom actuator 24 and stick actuator 26 are operated simultaneously, boom actuator 24, by virtue of having a predetermined ratio 84 of 0.7 as compared to a predetermined ratio 86 of 0.3 for stick actuator 26, receives relatively more hydraulic power from the hydraulic power sources than stick actuator 26.

According to some embodiments, the hydraulic device power output ratios are not necessarily added together at to determine a combined hydraulic power output ratio 94. Rather, each of hydraulic actuators 24, 26, and 28 may be balanced against one another independently, for example, such that if operation of boom actuator 24 is being balanced against operation of stick actuator 26 during simultaneous operation of both actuators 24 and 26, the predetermined ratio of digging implement actuator 28 does not affect the balance between operation of boom actuator 24 and stick actuator 26. Similarly, if operation of stick actuator 26 is being balanced against operation of digging implement actuator 28 during simultaneous operation of both actuators 26 and 28, the predetermined ratio of boom actuator 24 does not affect the balance between operation of stick actuator 26 and digging implement actuator 28. Also, if operation of boom actuator 24 is being balanced against operation of digging implement actuator 28 during simultaneous operation of both actuators 24 and 28, the predetermined ratio of stick actuator 26 does not affect the balance between operation of boom actuator 26 and digging implement actuator 28.

According to some embodiments, if the total requested hydraulic power at 76 exceeds the maximum available hydraulic power, the electric power output signal for electric motor 46 from lookup table 74 is multiplied at 96 by a predetermined electric power output ratio 98 to determine a reduced electric power output level 99 for electric motor 46. For example, the predetermined electric power output ratio 98 may have a value of, for example, 0.5, this value being exemplary only. Predetermined electric power output ratio 98 may be determined through computer simulation and/or experimentation to achieve desired responsiveness and/or speed of operation of electric actuator 46.

In this exemplary manner, the hydraulic and electric power output levels of the hydraulic actuators and electric actuators of machine 10 may be balanced to provide a desirable responsiveness and/or speed of the hydraulic and electric actuators. This may be desirable when, for example, the total requested combined hydraulic and electric power exceeds either the combined power available from all applicable power sources or the predetermined (or designed) combined maximum available power level. According to some embodiments, this may be desirable when, for example, the total requested hydraulic power exceeds the maximum available hydraulic power, or when the total requested electric power exceeds the maximum available electric power.

According to some embodiments, one or more of hydraulic power output ratios 84, 86, and 88 may be adjustable. This provides an ability to tailor the balance of operation (e.g., the relative responsiveness and/or speed of operation) between hydraulic actuators 24, 26, and 28. For example, by creating a greater disparity between hydraulic power output ratio 84 associated with hydraulic actuator 24 and hydraulic power output ratio 86 associated with actuator 26 (e.g., by increasing hydraulic power output ratio 84 and/or reducing hydraulic power output ratio 86), hydraulic actuator 24 will operate with relatively more responsiveness and/or speed as compared to hydraulic actuator 26. As a result, the relative responsiveness and/or speed of operation of actuators 24, 26, and/or 28 may be adjusted, for example, according to preferences of a machine operator.

For example, as shown in FIG. 4 control system 55 may include inputs for adjustable hydraulic power output ratios 84a, 86a, and 88a for adjusting the balance between the operation of boom 18, stick 20, and digging implement 22, respectively. If, for example, the total combined requested power level (e.g., both hydraulic and electric requests) at 76 exceeds the combined maximum available power output level (e.g., total available from all power sources of machine 10), the requested power output level of one or more of hydraulic actuators 24, 26, and 28 may be reduced according to respective adjustable hydraulic power output ratios 84a, 86a, and 88a. For example, each of the power output signals from lookup tables 68, 70, and 72 associated with the input signals for the hydraulic actuators 24, 26, and 28 is multiplied at 78, 80, and 82 by respective adjustable hydraulic power output ratios 84a, 86a, and 88a to determine reduced hydraulic power output levels for each of actuators 24, 26, and 28. According to some embodiments, one or more of adjustable hydraulic power output ratios 84a, 86a, and 88a may be adjustable within a predetermined range. For example, power output ratios 84a, 86a, and 88a may be adjustable within the following exemplary predetermined ranges: $0.5 \leq 84a \leq 0.9$; $0.2 \leq 86a \leq 0.5$; and $0.2 \leq 88a \leq 0.5$. According to some embodiments, if the total requested hydraulic power exceeds the maximum available hydraulic power, a similar power balancing may be performed. According to some embodiments, if the total requested electric power exceeds the maximum available electric power, a similar power balancing may be performed.

For embodiments with adjustable hydraulic power output ratios, an interface may be provided for facilitating such adjustment. For example, such an adjustment interface may include one or more adjustment devices (e.g., knobs and/or buttons) that may be accessed by a machine operator and/or a service technician. According to some embodiments, the adjustment interface may include a display (e.g., a touch-sensitive screen) for facilitating adjustment of one or more of adjustable hydraulic power output ratios 84a, 86a, and 88a. The adjustment interface may be physically incorporated into interface 56, or it may be remote from interface 56.

Some embodiments may include an ability to store a number of adjustment groups for selective access. For example, an adjustment group may include the following adjustment group combination: power output ratio $84a=0.9$; power output ratio $86a=0.4$; and power output ratio $88a=0.3$. In this manner, a machine operator may store one or more preset adjustment group combinations for adjustable hydraulic power output ratios 84a, 86a, and 88a for later selection. This may permit different machine operators to store different adjustment group combinations to tailor the balance of operation of the hydraulic actuators according to the balance desired by the different machine operators. This may also permit a machine operator to store different adjustment groups to tailor the balance of operation of the hydraulic actuators of a machine to different work procedures as desired.

The exemplary predetermined hydraulic power output ratios 84, 86, and 88 for actuators 24, 26, and 28, respectively, may provide balanced operation among hydraulic actuators 24, 26, and 28. Thus, for the exemplary ratios 84, 86, and 88 (or 84a, 86a, and 86a) (i.e., 0.7, 0.3, and 0.3), if boom actuator 24 and stick actuator 26 are operated simultaneously, boom actuator 24, by virtue of having a predetermined ratio 84 of 0.7 as compared to a predetermined ratio 86 of 0.3 for stick actuator 26, receives relatively more hydraulic power from the hydraulic power sources than stick actuator 26.

According to some embodiments, operation of electric actuators may be balanced, for example, with respect to other electric actuators and/or with respect to hydraulic actuators. For example, if the total combined requested power (e.g., both hydraulic and electric requests) at 76 exceeds the combined maximum available power level (e.g., from all power sources of machine 10), the electric power output signal for electric motor 46 from lookup table 74 is multiplied at 96 by a predetermined electric power output ratio 98 to determine a reduced electric power output level 99 for electric motor 46. The predetermined electric power output ratio 98 may have a value of, for example, 0.5, this value being exemplary only. Predetermined electric power output ratio 98 may be determined through computer simulation and/or experimentation to achieve desired responsiveness and/or speed of operation of electric actuator 46. According to some embodiments, if the total requested hydraulic power exceeds the maximum available hydraulic power, a similar power balancing may be performed. According to some embodiments, if the total requested electric power exceeds the maximum available electric power, a similar power balancing may be performed.

According to some embodiments, electric power output ratios may be adjustable in a manner similar to the hydraulic power output ratios. This provides an ability to tailor the balance of operation (e.g., the relative responsiveness and/or speed of operation) between, for example, electric actuator 46 and one or more of hydraulic actuators 24, 26, and 28. For example, by creating a greater disparity between electric power output ratio 98 associated with electric actuator 46 and one or more of hydraulic power output ratios 84, 86, and/or 88 associated with respective hydraulic actuators 24, 26, and/or 28 (e.g., by increasing or decreasing electric power output ratio 98 relative to one or more of hydraulic power output ratios 84, 86, and/or 88), electric actuator 46 will operate with relatively more or less responsiveness and/or speed as compared to hydraulic actuators 24, 26, and/or 28. As a result, the relative responsiveness and/or speed of operation of electric actuator 46 and hydraulic actuators 24, 26, and/or 28 may be adjusted, for example, according to preferences of a machine operator.

For example, as shown in FIG. 4 control system 55 may include inputs for an adjustable electric power output ratio 98a for adjusting the balance of operation between electric actuator 46 and boom 18, stick 20, and digging implement 22, respectively. For example, if the total combined requested power output at 76 exceeds the combined maximum available power output level, the requested power output level of electric actuators 46 may be reduced according to adjustable electric power output ratio 98a. For example, the power output signal from lookup tables 74 associated with the input signal for electric actuator 46 is multiplied at 96 by adjustable electric power output ratio 98a to determine a reduced electric power output level for electric actuator 46. According to some embodiments, adjustable electric power output ratio 98a may be adjustable within a predetermined range. For example, electric power output ratio 98a may be adjustable in an exemplary predetermined range of between about 0.3 and about 0.7. According to some embodiments, if the total requested hydraulic power exceeds the maximum available hydraulic power, a similar power balancing may be performed. According to some embodiments, if the total requested electric power exceeds the maximum available electric power, a similar power balancing may be performed.

The adjustment interface may facilitate adjustment of adjustable electric power output ratio 98a as well as adjustable hydraulic power output ratios 84a, 86a, and 86a. In embodiments able to store a number of adjustment groups for selective access, adjustable electric power output ratio 98a may be included in the adjustment group combinations. For example, an adjustment group may include the following adjustment group combination: hydraulic power output ratio 84a=0.9; hydraulic power output ratio 86a=0.4; hydraulic power output ratio 88a=0.3, and electric power output ratio 98a=0.5. In this manner, a machine operator may store one or more preset adjustment group combinations for adjustable hydraulic and electric power output ratios 84a, 86a, 88a, and 98a for later selection. This may permit different machine operators to store different adjustment group combinations to tailor the balance of operation of the hydraulic and electric actuators according to the balance desired by the different machine operators. This may also permit a machine operator to store different adjustment groups to tailor the balance of operation of the hydraulic and electric actuators of a machine to different work procedures as desired.

In this exemplary manner, the hydraulic and electric power output levels of the hydraulic and electric actuators of exemplary machine 10 may be balanced to provide a desirable responsiveness and/or speed of the hydraulic and electric actuators. This may be desirable when, for example, the total requested hydraulic power exceeds the maximum available hydraulic power.

Industrial Applicability

Exemplary machine 10 may be used for performing work. In particular, the exemplary machine 10 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

Exemplary system 55 for controlling power in machine 10 may be used to control power in a machine having both hydraulic and electric power sources, and both hydraulic and electric actuators. For example, when the total combined hydraulic and electric power requested exceeds the combined maximum available power (e.g., either the predetermined (e.g., designed) combined maximum available power level or the level of combined power available from all power sources), the exemplary system 55 may operate to reduce the total power output to the hydraulic actuators and/or the electric actuators to a level below the respective requested level, so that the hydraulic and electric actuators operate in a balanced manner, which may result more desirable operating characteristics for the machine. According to some embodiments, when the total hydraulic power requested exceeds the maximum available hydraulic power, the exemplary system 55 may operate to reduce the total power output to the hydraulic actuators to a level below the requested level, and reduce the total power output to the electric actuators, so that the hydraulic and electric actuators operate in a balanced manner, which may result more desirable operating characteristics for the machine. According to some embodiments, when the total electric power requested exceeds the maximum available electric power, the exemplary system 55 may operate to reduce the total power output to the hydraulic actuators to a level below the requested level, and reduce the total power output to the electric actuators, so that the hydraulic and electric actuators operate in a balanced manner, which may result more desirable operating characteristics for the machine.

According to some embodiments, exemplary system 55 may facilitate adjustment of the balance of operation between hydraulic and electric actuators. This may permit a machine operator and/or service technician to tailor the balance of operation between the hydraulic and electric actuators according to operator preferences. In addition, some embodiments may permit storage of one or more preset adjustment group combinations for adjustable hydraulic power output ratios and/or adjustable electric power output ratios for later selection. This may permit different machine operators to store different adjustment group combinations to tailor the balance of operation of the hydraulic and electric actuators according to the balance desired by the different machine operators. This may also permit a machine operator to store different adjustment groups to tailor the balance of operation of the hydraulic and electric actuators of a machine to different work procedures as desired.

It will be apparent to those skilled in the art that various modifications and variations can be made to the exemplary disclosed systems, methods, and machine. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for controlling power in a machine comprising an electric power source, a hydraulic power source, an electric actuator, and a hydraulic actuator, the system comprising:
   an interface; and
   a controller configured to:
      receive a signal indicative of a requested hydraulic operation of the hydraulic actuator, the requested hydraulic operation corresponding to a requested hydraulic power level;
      receive a signal indicative of a requested electric operation of the electric actuator, the requested electric operation corresponding to a requested electric power level;
      provide a signal for supplying an amount of electric power to the electric actuator at a level less than the requested electric power level based on an electric power output ratio; and
      provide a signal for supplying an amount of hydraulic power to the hydraulic actuator at a level less than the requested hydraulic power level based on a hydraulic power output ratio,
   wherein at least one of the electric power output ratio and the hydraulic power output ratio is adjustable for the requested hydraulic and electric operations via the interface, and
   wherein at least one of the electric power output ratio and the hydraulic power output ratio is adjustable within a predetermined range of ratios.

2. The system of claim 1, wherein the controller is configured provide the signal for supplying the amount of electric power to the electric actuator and the signal for supplying the amount of hydraulic power to the hydraulic actuator based on at least one of the following determinations:
   a combined requested power level of a sum of the requested hydraulic and electric power levels is greater than a combined maximum available power level,
   the requested hydraulic power level is greater than a maximum available hydraulic power level, and
   the requested electric power level is greater than a maximum available electric power level.

3. The system of claim 2, wherein the respective maximum available power levels are based on either a predetermined maximum or a level of power available from the respective power sources upon receipt of the signals indicative of the requested hydraulic and electric operation.

4. The system of claim 3, wherein the respective maximum available power levels are based on a lesser of the predetermined maximum and the level of power available from the respective power sources.

5. The system of claim 1, wherein the machine includes a plurality of hydraulic actuators, and wherein the controller is configured to:
   receive signals indicative of requested hydraulic operation of the plurality of hydraulic actuators, each requested hydraulic operation corresponding to a requested hydraulic power level for each of the hydraulic actuators;
   sum the requested hydraulic power levels and the requested electric power level to determine a total requested power level;
   provide a signal for supplying an amount of electric power to the electric actuator at a level based on the electric power output ratio; and
   provide a signal for supplying an amount of hydraulic power to each of the plurality of hydraulic actuators at a level based on respective hydraulic power output ratios associated with each of the respective hydraulic actuators,
   wherein at least one of the respective hydraulic power output ratios is adjustable via the interface.

6. The system of claim 5, wherein the controller is configured to store a selected combination of the electric power output ratio and the hydraulic power output ratios.

7. A method executable by a processor of operating a hydraulic actuator and an electric actuator, the method comprising:
   receiving a signal indicative of a requested hydraulic operation of the hydraulic actuator, the requested hydraulic operation corresponding to a requested hydraulic power level;
   receiving a signal indicative of a requested electric operation of the electric actuator, the requested electric operation corresponding to a requested electric power level;
   providing a signal for supplying an amount of electric power to the electric actuator at a level less than the requested electric power level based on an electric power output ratio;
   providing a signal for supplying an amount of hydraulic power to the hydraulic actuator at a level less than the requested hydraulic power level based on a hydraulic power output ratio; and
   adjusting at least one of the electric power output ratio and the hydraulic power output ratio for the requested hydraulic and electric operations via an interface,
   wherein adjusting at least one of the electric power output ratio and the hydraulic power output ratio comprises adjusting the at least one of the electric power output ratio and the hydraulic power output ratio within a predetermined range of ratios.

8. The method of claim 7, wherein providing the signal for supplying the amount of electric power to the electric actuator and the signal for supplying the amount of hydraulic power to the hydraulic actuator based on at least one of the following determinations:
   a combined requested power level of a sum of the requested hydraulic and electric power levels is greater than a combined maximum available power level,
   the requested hydraulic power level is greater than a maximum available hydraulic power level, and
   the requested electric power level is greater than a maximum available electric power level.

9. The method of claim 8, wherein the respective maximum available power levels are based on either a predetermined maximum or a level of power available from the respective power sources upon receipt of the signal indicative of the requested hydraulic and electric operation.

10. The method of claim 9, wherein the respective maximum available power levels are based on a lesser of the predetermined maximum and the level of power available from the respective power sources.

11. The method of claim 7, further including:
receiving signals indicative of requested hydraulic operations of a plurality of hydraulic actuators, each requested hydraulic operation being associated with a respective requested hydraulic power level;
summing the requested hydraulic power levels and the requested electric power level to determine a total requested power level; and
providing respective signals for supplying an amount of hydraulic power to each of the plurality of hydraulic actuators at a level based on respective hydraulic power output ratios associated with each of the respective hydraulic actuators,
wherein at least one of the respective hydraulic power output ratios is adjustable via the interface.

12. The method of claim 11, further including storing a selected combination of the electric power output ratio and the hydraulic power output ratios.

13. A machine comprising:
a chassis;
an interface;
an electric power source coupled to the chassis;
a hydraulic power source coupled to the chassis;
an electric actuator coupled to the machine and in operative communication with the electric power source;
a hydraulic actuator coupled to the machine and in operative communication with the hydraulic power source; and
a controller configured to:
receive a signal indicative of a requested hydraulic operation of the hydraulic actuator, the requested hydraulic operation corresponding to a requested hydraulic power level;
receive a signal indicative of a requested electric operation of the electric actuator, the requested electric operation corresponding to a requested electric power level;
provide a signal for supplying an amount of electric power to the electric actuator at a level less than the requested electric power level based on an electric power output ratio; and
provide a signal for supplying an amount of hydraulic power to the hydraulic actuator at a level less than the requested hydraulic power level based on a hydraulic power output ratio,
wherein at least one of the electric power output ratio and the hydraulic power output ratio is adjustable for the requested hydraulic and electric operations via the interface, and
wherein at least one of the electric power output ratio and the hydraulic power output ratio is adjustable within a predetermined range of ratios.

14. The machine of claim 13, wherein the electric power source includes at least one of a generator, a battery, and an ultra-capacitor.

15. The machine of claim 13, wherein the hydraulic power source includes at least one of a hydraulic pump and an accumulator.

16. The machine of claim 13, wherein the electric actuator includes an electric motor.

17. The machine of claim 13, wherein the hydraulic actuator includes at least one of a hydraulic motor and a hydraulic cylinder.

18. The machine of claim 13, wherein the machine further includes:
a cab rotatably mounted on the chassis;
a boom pivotally coupled to the cab; and
a stick pivotally coupled to the boom,
wherein the electric actuator includes an electric motor coupled to the cab and the chassis for rotating the cab with respect to the chassis,
wherein a first hydraulic actuator is coupled to the cab and the boom for pivotally moving the boom with respect to the cab, and
wherein a second hydraulic actuator is coupled to the boom and the stick for pivotally moving the stick with respect to the boom.

19. The machine of claim 18, further comprising an implement pivotally coupled to the stick, and a third hydraulic actuator coupled to the stick and the implement for pivotally moving the implement with respect to the stick.

20. The machine of claim 19, wherein the controller is configured to:
receive signals from the interface indicative of requested hydraulic operation of the first, second, and third hydraulic actuators, each of the requested hydraulic operations corresponding to a requested hydraulic power level for each of the first, second, and third hydraulic actuators;
sum the requested hydraulic power levels to determine a total requested hydraulic power level; and
provide signals for supplying an amount of hydraulic power to each of the first, second, and third hydraulic actuators at a level based on respective hydraulic power output ratios;
wherein the respective hydraulic power output ratios are adjustable via the interface.

21. The machine of claim 20, wherein the controller is configured to store a selected combination of the electric power output ratio and the hydraulic power output ratios.

22. The machine of claim 13, wherein at least one of the electric power output ratio and the hydraulic power output ratio is adjustable within a predetermined range of ratios.

* * * * *